(12) United States Patent
Alexander et al.

(10) Patent No.: US 6,864,457 B1
(45) Date of Patent: Mar. 8, 2005

(54) LASER MACHINING OF MATERIALS

(75) Inventors: Dennis R. Alexander, Lincoln, NE (US); Brian W. Milulka, Lincoln, NE (US); David W. Doerr, Lincoln, NE (US)

(73) Assignee: The Board of Regents of the University of Nebraska, Lincoln, NE (US)

( * ) Notice: Subject to any disclaimer, the term of this patent is extended or adjusted under 35 U.S.C. 154(b) by 133 days.

(21) Appl. No.: 10/347,533

(22) Filed: Jan. 21, 2003

Related U.S. Application Data (60) Provisional application No. 60/370,892, filed on Apr. 8, 2002, and provisional application No. 60/359,133, filed on Feb. 25, 2002.

(51) Int. Cl.⁷ .............................................. B23K 15/00
(52) U.S. Cl. ................................ 219/121.11; 219/121.6
(58) Field of Search .................... 219/121.11, 121.6, 219/121.67, 121.68, 121.69, 121.7, 121.71, 121.85

(56) References Cited

U.S. PATENT DOCUMENTS

| | | | |
|---|---|---|---|
| 4,131,484 A | * 12/1978 | Caruso et al. ................. 134/1 |
| 4,347,785 A | * 9/1982 | Chase et al. ............... 101/38.1 |
| 4,784,491 A | * 11/1988 | Penney et al. ............... 356/606 |
| 5,359,176 A | * 10/1994 | Balliet et al. .......... 219/121.84 |
| 5,656,186 A | 8/1997 | Mourou et al. |
| 5,761,111 A | 6/1998 | Glezer |
| 5,787,102 A | 7/1998 | Alexander et al. |
| 5,862,845 A | 1/1999 | Chin et al. |
| 6,204,475 B1 | * 3/2001 | Nakata et al. .......... 219/121.84 |
| 6,246,025 B1 | * 6/2001 | Scott ..................... 219/121.67 |
| 6,285,002 B1 | 9/2001 | Ngoi et al. |
| 6,313,461 B1 | 11/2001 | McClelland et al. |
| 6,337,479 B1 | 1/2002 | Kley |
| 6,420,674 B1 | * 7/2002 | Cole et al. ............. 219/121.67 |
| 6,692,337 B2 | * 2/2004 | Jennings et al. .............. 451/36 |
| 2002/0162973 A1 | * 11/2002 | Cordingley et al. ..... 250/492.2 |
| 2002/0166845 A1 | * 11/2002 | Cordingley et al. ... 219/121.62 |
| 2002/0167581 A1 | * 11/2002 | Cordingley et al. ........ 347/173 |

OTHER PUBLICATIONS

"Breakdown Threshold and Plasma Formation in Femtosecond Laser–Solid Interation", Von Der Lind et al., J. Opt. Soc. Am. B., Opt. Phys. vol. 13, No. 1, (Jan. 1996).

"Laser Ablation and Micromachining with Ultrashort Laser Pulses", Liu et al., IEEE J. of Quantum Electronics, vol. 33, No. 10 (Oct. 1997).

"Femtosecond–Pulse Laser Microstructuring of Semiconductor Materials", Kautek et al., Mat. Science Forum 173–174, (1995).

"Short–Pulse Laser Ablation of Solid Targets", Momma et al., Optics Comm. 129, (1996).

"Experimental Study of Drilling Sub–10 n Holes in Thin Metal Foils With Femtosecond Laser Pulses", Zhu et al., Appl. Surf. Sci, 152, (1999).

"Machining of Sub–Micron Holes Using a Femtosecond Laser at 800 nm", Pronko et al., Optics Comm. 114 (1995).

"Ablation of Submicron Structures of Metals and Semiconductors by Femtosecond uv–Laser Pules", Simon et al., Appl. Surf. Sci. 109–110, (1997).

"Self–Modulation and Self–Focusing of Electromagentic Waves in Plasmas", Max et al., Phys. Rev. Lett. vol. 33, No. 4 (Jul. 1974).

(List continued on next page.)

*Primary Examiner*—M. Alexandra Elve
(74) *Attorney, Agent, or Firm*—James D. Welch (57) ABSTRACT

Disclosed are systems and methods for reducing the adverse effects of particles which become dislodged by scribing and laser machining of materials, which dislodged particles otherwise accumulate on laser machined material surfaces and cause adverse effects.

37 Claims, 6 Drawing Sheets

OTHER PUBLICATIONS

"Relativistic and Charge–Displacement Self–Channeling of Intense Ultrashort Laser Pulses in Plasmas", Borisov et al., Physical Rev. A 45(8), (Apr. 1992).

"Measurable Signatures of Self–Focusing in Underdense Plasma", Gibbon et al., Phys. Plasmas, 2(4), (Apr. 1995).

"Dynamics of Subpicosecond Relativistic Laser Pulse Self–Channeling in an Underdense Preformed Plasma", Fuchs et. al., Phys. Rev. Lett., vol. 80, No. 8, (Feb. 1998).

"Evolution of a Plasma Waveguide Created During Relativistic–Ponderomotive Self–Channeling of an Intense Laser Pulse", Chen et al., Phys. Rev. Let. vol. 80, No. 12, (Mar. 1998).

"Relativistic Nonlinear Optics the Second Wind of Nonlinear Optics", Mourou et al., Ultrashort Laser Workshop for DOD Applications, NSF–Center for Ultrafast Optical Science University of Michigan, (Mar. 2000).

"Microstructuring of Silicon with Femtosecond Laser Pulses", Her et al., Appl. Phys. Lett. vol. 73, No. 12, (Sep. 1998).

* cited by examiner

LASER MACHINING OF MATERIALS

This Application claims benefit of Provisional Applications Ser. No. 60/359,133 Filed Feb. 25, 2002, and Ser. No. 60/370,892 filed Apr. 8, 2002.

TECHNICAL FIELD

The disclosed invention relates to laser scribing and machining of materials, and more particularly to systems and methods for reducing the adverse effects of particles which are dislodged from materials by laser scribing and machining, which particles otherwise accumulate on processed material surfaces where they can cause adverse effects.

BACKGROUND

To begin, it is noted that the first known creation of two micron diameter or less, high aspect ratio, (eg. Depth/Diameter greater than 7.0), holes was achieved using femto second laser pulses. Further the usefulness of said holes is only recently being explored, particulalry by the semiconductor industry as it strives to achieve ever smaller size and lower operating power devices. The machining of materials using laser beams is known. For instance a Patent to Mourou et al, U.S. Pat. No. 5,656,186 describes the use of laser pulses which are characterized by having a pulse width equal to or less than a characteristic value, and focusing said laser pulses on or below the surface of a material. The characteristic pulse width is determined by noting a rapid and distinct change in slope of fluence breakdown threshold vs. laser pulse width. U.S. Pat. No. 6,285,002 to Ngoi et al. describes a three-dimensional micro-machining system comprising application of a spatial filter to fashion laser pulses. U.S. Pat. No. 5,787,102 to Alexander et al. describes use of a periodically structured non-linear material to generate second harmonics in a laser system. U.S. Pat. No. 5,761,111 to Glezer describes application of ultrashort laser pulses in forming 2D and 3D optical information storage in transparent materials. U.S. Pat. No. 6,313,461 to McClelland et al. describes detection of photoelectrons ejected from the surface of a material being machined to image magnetic and/or spectroscopic features of the surface of a sample. A Patent to Chin et al., U.S. Pat. No. 5,862,845 describes use of an ultrafast intense laser for processing lignocellulosic materials. Use of pulses of less than $10^{-9}$ sec. and having peak intensity of at least 1011 w/cm$^2$ is described. In the context of the presently disclosed invention, a very relevant Patent is U.S. Pat. No. 6,337,479 to Kley. Said 479 patent describes the use of a scanning probe microscope probe to sweep away debris particles on a materials surface caused by laser machhining thereof. The Kley 419 patent is particularly relevant as it identifies the problem caused by particles which become dislodged and accumulate on a material's surface during laser-machining thereof by use of laser pulses caused to impinge thereupon.

Relevant Scientific Articles include:

"Breakdown Threshold and Plasma Formation in Femtosecond Laser-Solid Interaction", Linde and Schyler, J. of the Opt. Soc. of America B., Opt. Phys. 13(1), (1996);

"Laser Ablation and Micromachining with Ultrashort Laser Pulses", Lie et al., IEEE J. of Quantum Electronic 33(10) (1997);

"Femtosecond-Pulse Laser Microstructuring of Semiconductor Materials", Kautek et al., Mat. Science Forum 173, (1995);

"Short-Pulse Laser Ablation of Solid Targets", Momma et al., Optics Comm. 129, (1996);

"Experimental Study of Drilling Sub-10 n Holes in Thin Metal Foils With Femtosecond Laser Pulses", Zhu et al., Appl. Surf. Sci. 152, (1999);

"Machining of Sub-Micron Holes Using a Femtosecond Laser at 800 nm", Pronko et al., Optics Comm. 114, (1995);

"Ablation of Submicron Structures on Metals and Semiconductors by Femtosecond uv-Laser Pulse", Simon et al., Appl. Surf. Sci. 109–110, (1997);

"Self-Modulation and Self-Focusing of Electromagentic Waves in Plasmas", Max et al., Phys. Rev. Letters 33(4), (1974;

"Self-Modulation and Self-Focusing of Electromagentic Waves in Plasma", Borisov et al., Physical Rev. A 45(8), (1992);

"Measurable Signatures of Self-Focusing in Underdense Plasma", Gibbon et al., Phys. of Plasma, 2(4), (1995);

"Dynamics of Subpicosecond Relativistic Laser Pulse Self-Channeling in an Underdense Preformed Plasma", Phys. Rev. Lett., 80(8), (1998);

"Evolution of a Plasma Waveguide Created During Relativistic-Ponderomotive Self-Channeling of an Intense Laser Pulse", Chen et al., Phys. Rev. Let. 80(12), (1998);

"Relativistic Nonlinear Optivcs the Second Wind of Non-linear Optics", Mourou et al., Ultrashort Laser Workshop for DOD Applications, NSF-Center for Ultrafast Optical Science University of Michigan, (March 2000);

"Breakdown Threshold and Plasma Formation in Femtosecond Laser-Solid Interaction", Linde et al., J. of the Opt. Soc. of America B., Opt. Phys. 13(1), (1996);

"Microstructuring of Silicon with Femtosecond Laser Pulses", Her et al., Appl. Phys. Lett. 73(12), (1998).

Even in view of the existing art, there is identified a need for system and method means which can be applied to conveniently avoid accumulation of dislodged particles upon the surface of a material being micro machined by application of laser pulses thereto. The disclosed invention provides new, novel and useful solution means to said problem.

DISCLOSURE OF THE INVENTION

The disclosed invention comprises system and method means for reducing the adverse effects of dislodged particles during laser machining of materials, embodiments of which comprise selection(s) from six primary components:

directing laser pulses to approach a material surface from beneath, along a generally upward vertical locus so that gravity causes dislodged particles to fall away;

directing laser pulses to approach a material surface along a locus between upward vertical upward from beneath, and horizontal, inclusive, so that gravity causes dislodged particles to fall away;

directing laser pulses to approach a material surface along a locus which passes through a fluid;

causing laser pulses to be split into first and second laser beams, the first laser beam thereof being directed to approach a first surface of a material which comprises two surfaces, and the second laser beam being substantially simultaneously directed to approach a second surface, or a different location on the first surface of said material which comprises two surfaces;

formation of a series of laser pulses by splitting a laser pulse into two such laser pulses, entering a time delay into one thereof and then recombining the two pulses into a sequence of two laser pulses, use of electrons developed by interaction of laser pulses with a material to effect real time observation and optionally control of machining results.

While many laser pulse producing systems can be applied in practice of the disclosed invention, prefered laser pulses are fashioned from a Femtosecond Oscillator and a Regenerative Chirped Pulse Amplifier of 795 nm wavelength, (possibly frequency doubled to 400 nm), and repeated at 996 Hz, with a final output level being set with a half wave-plate CVI part QWPO-800-05-2-R10, and a Glans laser Polarizer part 03PGL303. Beam direction can be provided by dichroic mirrors, CVI Part No. TLMI-800.0-1037, with focusing provided by an Optics For Research Part No. LMU-15x-NUV objective. As the Focusing Lens is optimized at around 400 nm, Power Readings are typically taken there-before with a Newport Power Meter Model 835 and thereafter with Newport Power Meter Model 1815-C. Where a gas fluid flow, (eg. compressed nitrogen, or an Air Dimension Model 01310TCQ Vacuum Pump can be used to create a Gas flow or Vacuum Stream), is utilized to sweep away dislodged particles, a nozzle constructed from a short length of stainless steel tubing, with an aperture opening of 7.35 nm by 0.64 nm can be utilized to provide the gas flow, and a Cole-Parmer FM044-40 flow rate—monitor can be applied to monitor the flow.

A disclosed system for laser-machining materials comprises:

a femto second or shorter laser pulse producing means;

said femto second or shorter laser pulse producing means being oriented in said system such that laser pulses produced thereby are caused to approach the surface of said material from therebeneath;

such that in use particles dislodged by the application of said femto second or shorter laser pulses to said downward facing surface of said material are caused to fall away from the surface of said material under the influence of gravity. Said laser pulses can be caused to approach the surface of said material from therebeneath via selections from the group:

mirror means;

at least one lens; and an aperture plate;

such that the femto second or shorter laser pulse producing means provides laser pulses to the surface of the material by way of reflection from said mirror means, and wherein said at least one lens serves to focus the pulses through said aperture plate and toward said material surface; the aperture plate, when present, being situated above said mirror means and below said downward facing surface of said material so as to intercept dislodged particles and prevent their accumulation on said mirror means.

Another disclosed system for producing a sequence of laser pulses comprises:

femto second or shorter laser pulse producing means;

beam splitter means;

first mirror means;

time delay entry means;

second mirror means; and beam combiner means;

such that laser pulses produced by said femto second or shorter laser pulse producing means are caused to impinge on said beam splitter with approximately half thereof passing directly to said beam combiner means, and with the remaining approximatley half thereof being caused to interact with, in any functional order, said first mirror means, time delay entry means, and second mirror means before passing to said beam combiner; there emerging from said beam combiner, for each laser pulse entered to the beam splitter, a sequence of pulses offset in time from one another.

Another disclosed system for laser-machining materials comprises:

a femto second or shorter laser pulse producing means, said system further comprising means therewithin to direct laser pulses onto a material surface which is oriented to face between vertically downward and horizontally, along a locus which is oriented between vertically upward and horizontal, inclusive of vertical and horizontal;

such that in use particles dislodged by the application of said laser pulses to said surface of said material are caused to fall away from the surface of said material under the influence of gravity.

Another disclosed system for laser-machining materials is comprised of:

a femto second or shorter laser pulse producing means;

beam splitter;

first mirror means;

second mirror means; and optionally additional mirror means;

oriented such that laser pulses provided by the femto second or shorter laser pulse producing means are caused to enter said beam splitter, with approximatley half of each laser pulse passing directly through said beam spliter and impinging on a surface of said material, and with the remaining approximately half of each laser pulse proceeding to interact with said second and optionally additional mirror means and then impinge on the same or another surface of said material.

Another disclsoed system for laser-machining materials comprises:

a femto second or shorter laser pulse producing means in functional combination with means for submerging the surface of a material, which surface is to be machined, in a fluid;

said laser pulse producing means being oriented in said system such that laser pulses produced by said laser pulse producing means are caused to approach the surface of said material by said system, along a locus which passes through said fluid;

such that in use particles dislodged by the application of said laser pulses to said surface of said material are caused to be entered to said fluid. Said system laser pulse producing means can be, but are not necessarily, situated vertically above the material surface.

A disclosed method of laser-machining materials then comprises the steps of:

providing a laser pulse producing means and a material, the surface of which is to be machined;

orienting said laser pulse producing means and material such that laser pulses produced by said laser pulse producing means are caused to approach the surface of said material from therebeneath;

such that particles dislodged by the application of said laser pulses to said surface of said material are caused to fall away from the surface of said material under the influence of gravity.

A modified disclosed method of laser-machining materials comprising the steps of:

providing a laser pulse producing means and a material, the surface of which is to be machined;

orienting said laser pulse producing means and material such that laser pulses produced by said laser pulse producing means are caused to approach a substantially vertically oriented surface of said material, along a substantially horizontally oriented locus;

such that particles dislodged by the application of said laser pulses to said surface of said material are caused to fall away from the surface of said material under the influence of gravity.

Another modified method of laser-machining materials comprising the steps of:

providing a laser pulse producing means and a material, the surface of which is to be machined;

orienting said laser pulse producing means and material such that laser pulses produced by said laser pulse producing means are caused to approach a surface of said material which is oriented to face between vertically downward and horizontally, along a locus which is oriented between vertically upward and horizontally;

such that particles dislodged by the application of said laser pulses to said surface of said material are caused to fall away from the surface of said material under the influence of gravity.

Another modified disclosed method of laser-machining materials comprising the steps of:

providing a laser pulse producing means and a material, the surface of which is to be machined;

providing a fluid containing means and placing said material thereinto;

orienting said laser pulse producing means and material which is placed into said fluid containing means such that laser pulses produced by said laser pulse producing means are caused to approach the surface of said material along a locus which passes through said fluid;

such that particles dislodged by the application of said laser pulses to said surface of said material are caused to be removed from the surface of said material into said fluid. It has been found that flow of the fluid is not absolutely necessary to effect dispersal of dislodged particles, and the fluid can be any functional fluid, with examples being gas, or fluid, (eg. acetone, methyl or ethyl alcohol or trichlorethelyne etc.).

Another modified disclosed method of laser-machining materials comprising the steps of:

providing a laser pulse producing means and a material, which is to be machined;

providing a beam splitter and beam directing means such that a laser pulse entering thereinto exits therefrom as two pulses, each of which can be directed by said beam directing means to interact with said material;

orienting said laser pulse producing means and material such that laser pulses produced by said laser pulse producing means are caused to pass through said beam splitter, with the resulting two pulses being directed in a manner characterized by a selection from the group consisting of:

to interact with different surfaces of said material; and to interact with a surface of said material at different locations thereupon.

It is further disclosed that electrons developed by interaction of laser pulses with a material can be utilized to effect real time observation and optionally control of said laser-machining results.

The presently disclosed invention Laser Pulses are preferably femto or atto second in length, but pulses as long as nano-second pulses can, in some circumstances, beneficially be utilized.

It should be apparent that the various disclosed systems can be applied in practice of the various disclosed method sequences.

While not limiting, it is noted that the presently disclosed invention is particulalry well suited for the machining of diamond and other semiconductors.

It is also to be understood that while "scribing" of a material typically involves other than laser ablation of holes into and/or lines through a material etc., for the purposes of this Disclosure the laser scribing of a material, such as a semiconductor substrate to facilitate separating individual devices fabricated therein, is to be considered as machining of said material. The use of both terms "scribing" and "machining" at some points in this Disclosure is to call attention to various applications to which the disclosed invention can be adapted without escaping the scope of the claims.

The presently disclosed invention will be better understood by reference to the Detailed Description Section of this Specification, in conjunction with the Drawings.

SUMMARY

It is a general primary purpose and/or objective of the disclosed invention to teach systems and methods for laser machining materials, which systems and methods have as a primary purpose the avoidance of adverse effects caused by dislodged particles.

It is a specific purpose and/or objective of the disclosed invention to teach systems and methods for laser machining materials where in machined surfaces of materials are caused to face in a direction which enables the influence of gravity to cause dislodged particles to fall away therefrom.

It is another specific purpose and/or objective of the disclosed invention to teach systems and methods for laser machining materials where in machined surfaces of materials are caused to be submerged in fluid, said fluid serving to effect removal of dislodged particles.

It is yet another specific purpose and/or objective of the disclosed invention to teach systems and methods for laser scribing of materials.

Other purposes and/or objectives of the disclosed invention will become apparent upon a reading of the Specification and claims.

DETAILED DESCRIPTION

As identified in the Disclosure of the Invention Section of this Specification, a problem which occurs in micro or nano-scale laser machining of materials is that dislodged particles accumulate on surfaces of said materials and, to avoid untoward effects caused there presence, must be removed. The Patent to Kley, U.S. Pat. No. 6,337,479 identified one method of doing so is to sweep such particles away using a scanning probe microscope probe. It would be preferable, however, if the problem could be avoided, rather than solved after it occurs. In that light the presently disclosed invention teaches that laser processed materials should preferably be oriented during processing such that dislodged particles are influenced by gravity to naturally fall away from a material surface being worked, or so that laser pulses approach a material surface through a fluid which mediates dislodged particle removal, either by a disperal or by being swept away in a flow of gas of liquid.

Figure 1:
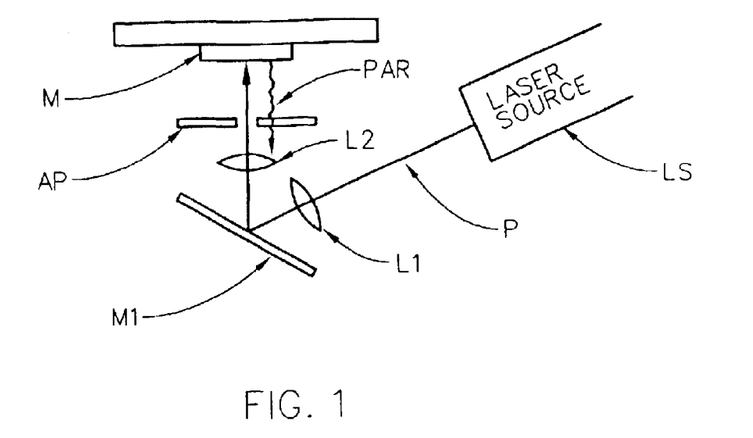
FIG. 1 shows a system useful in practice of an embodiment of the disclosed invention in which a surface of a material (M) to be machined by Laser Pulses is oriented to face downward so that dislodged particles fall away under gravity.

Turning now to FIG. 1, there is shown a system useful in practice of an emodiment of the disclosed invention. Shown are a Laser System (LS) which is capable of producing short pulses, (eg. nano or femto or atto second length), and a Material (M) to be processed. Note that a surface of said material (M) is oriented to face downward. In use the Laser System (LS) is shown to cause pulses to approach the surface of said Material (M) from beneath. It should be readily apparent that dislodged Particles (PAR) removed from said downward facing surface of said Material (M) will fall away under the influence of gravity. Note that Mirror (M1) is used to direct the laser pulses.

Figure 2:
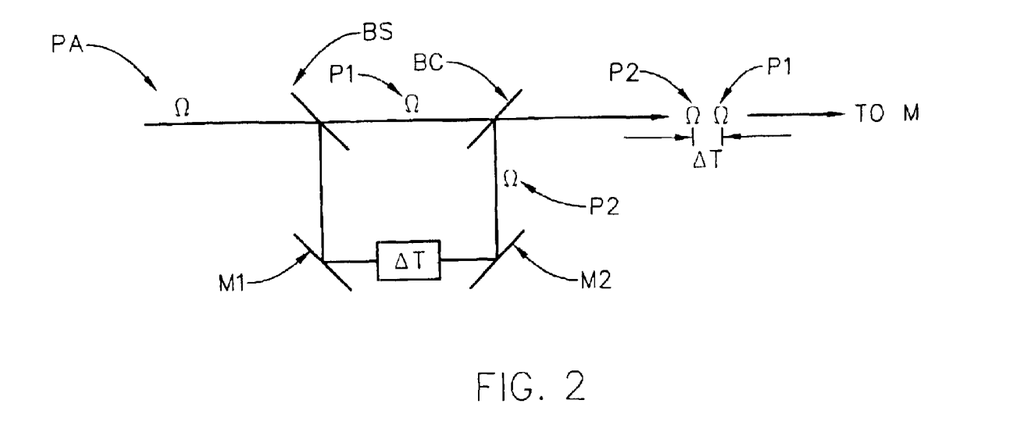
FIG. 2 demonstrates a system for producing a sequence of two Laser Pulses which is useful in practicing the disclosed invention.

FIG. 2 demonstrates a system for producing a sequence of two Laser Pulses which is useful in practicing the disclosed invention. Shown is a Beam Splitter (BS) into which is introduced a Laser Pulse. Two laser Pulses (P1) and (P2) emerge, one of which is subjected to a Time Delay ($\Delta T$), before the two Laser Pulses passed through a Beam Combiner (BC). A single Laser Pulse then emerges as two concatonated lower intensity Laser Pulses separated in Time, which sequence of pulses is passed to the Mirror (M2) for directing to the Material (M). It is to be understood that the Time Delay ($\Delta T$) introducing means can be located as shown, or between the Beam Splitter and first Mirror Means (M1) or between the Second Mirror Means (M2) and the Beam Combiner Means (BC), (ie. in any functional location).

Figure 3:
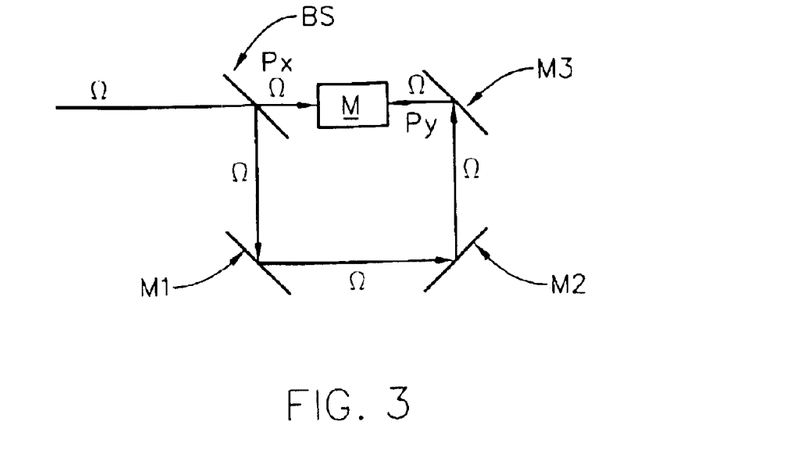
FIG. 3 shows a system for presenting Laser Pulses to different sides of a Material.
Figure 4:
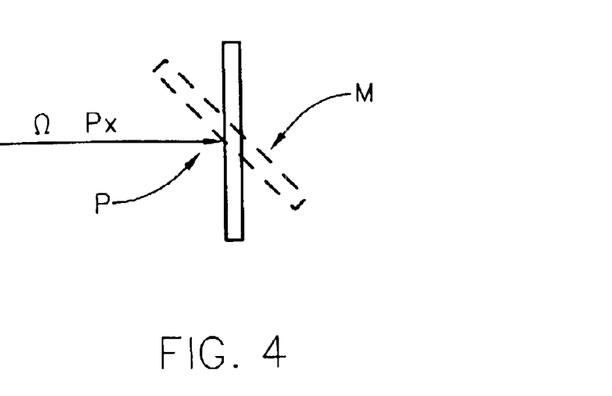
FIG. 4 indicates that the presently disclosed invention can provide that a single Laser Pulse can be applied to a substantially vertically oriented Material Surface so that dislodged particles fall away under gravity.

FIG. 3 shows a system for presenting Laser Pulses (PX) and (PY) to different sides of a Material (M). Said Laser Pulses (PX) and (PY) can be applied to Material (M) simultaneously or one thereof after a Time Delay, perhaps via a FIG. 2 type Beam Splitter (BS). Note that the sequence of Mirror Means (M1), (M2) and (M3) serve to direct one of the Laser Pulses (PY). Further, two pulses (Px) (Py) can be formed by a beam splitter, and both be directed to impinge upon a single surface of a Sample. It is also noted FIG. 4 indicates that the presently disclosed invention can provide that a single Laser Pulse (PX) or (PY), (or both which is not shown), can be applied to a substantially vertically oriented Material (M) Surface so that dislodged particles (PAR) fall away under the influence of gravity. Any orientation between a downward facing surface and a laterally facing surface is within the scope of the presently disclosed invention, if gravity influences dislodged particles (PAR) to fall away from a machined surface.

Figure 5:
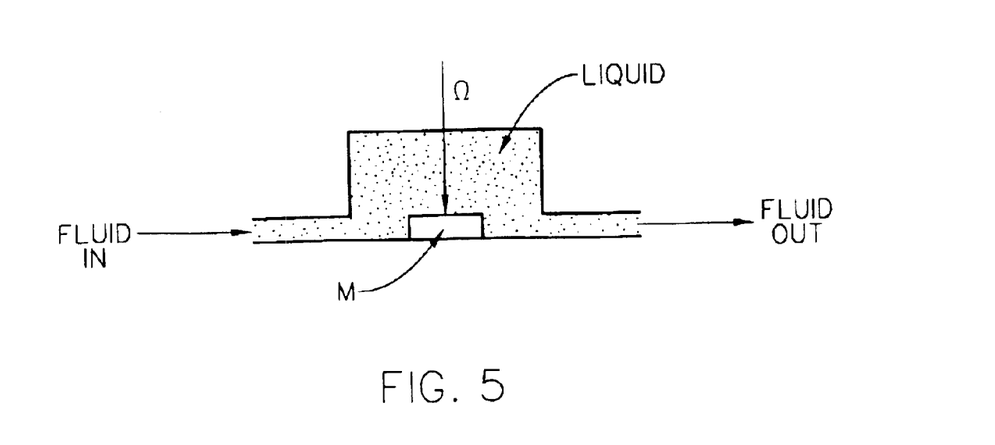
FIG. 5 is included to indicate that an upwardly facing surface of a Material can be subjected to Laser Pulses through a fluid.

FIG. 5 is included to indicate that a surface of a Material (H) can be subjected to Laser Pulses through a fluid (LIQ), and dislodged particles removed thereinto even when the material surface is oriented to face upward. Said Liquid (LIQ) can be made to flow, but it has not been necessary in some experiments to require a flow thereof to disperse dislodged particles (PAR) from the surface. It has also been found that applying Laser Pulses through a fluid in which a Material (M) is submerged helps prevent Brittle Materials from breaking. Fluids useful include air, nitrogen gas, water, acetone, methonal, ethonal, trichloroethlyne etc.

As indicated in the Disclosure of the Invention Section herein, combinations of the identified systems shown in FIGS. 1–5 can be fashioned to enable practice of the methods of the presently disclosed invention.

EXAMPLE 1

To demonstrate the utility enabled by practice of the disclosed invention, P-type (111) Silicon with a restivity of 8 m-ohm-cm was processed by various combinations of laser pulse width, repitition rate, total number of pulses and power per pulse etc., to the end that holes with a diameter on the order of a micron to a few microns, and a depth to width aspect ratio of up to about 8, were achieved. Diameter, (both inside and outside surface rim), and Depth Results were documented both in the case wherein no effort was made to prevent dislodged debris from accumulating on the Silicon being processed, and wherein effort was made to prevent said dislodged debris accumulation during Silicon processing, and it is noted at this point that where dislodged debris was not allowed to accumulate on the processed Silicon, superior results were achieved.

A regenerative laser amplifier system based on chirped pulse amplification was applied to provide low energy pulses from a mode-locked Ti:sapphire oscillator, Spectrea-Physics Tsunmi. The oscillator was pumped by a Spectra-Physics Millennia V, diode pumped visible cw laser. The oscillator beam was passed through a faraday isolator, manufactured by EOT, and sent into the regenerative amplifier system. A Photonics Industries Model TRA-50-2 system was pumped by an intra-cavity frequency doubled, q-switched Nd:YLF Laser, Photonics Industries Model GM-30. Said system can typically output 150 fs pulses at one-kiloherts, with a maximum energy of 800 micro-joules per pulse. The laser provided a nominal wavelength of 795 nm which can be frequency doubled to 397 nm using a Casix 1 mm thick Barium Borate (BBO) crystal. 0.5

The output beam was frequency doubled utilizing a BBO crystal and sent through neutral density filters to attenuate the power to a range suitable to the materials being processed. The final output power was set with a half-wave plate, CVI part QWPO-400-05-2-R10, and a Glan Laser Polarizer, Melles Griot Part 03PGL303 and the beam was directed utilizing dichroic mirrors, CVI Part No. LWP-45-R400-T800-PW-1025-UV. Filtering was performed to block any residual 795 nm wavelength content. An Optics Research Objective Lens, Part No. LMU-15x-NUV was then used to focus the beam. This lens system was selected as it provides a magnification of 15 times and a working distance of 11 nm. The long focal length helps to prevent dislodged debris from accumulating thereupon in use. It is noted that sample positioning was performed using Melles Griot Nanomotion II Translation Stages, with X and Y axes controlled with Melles Griot Model 11NCM001, and with the Z axis controlled by Melles Griot Model 11NCM005 Contrtolers. A color CCD Camera, Toppica TP-8001A was used to facilitate alignment and viewing in real-time. A Dolan Jenner Fiber-Lite Model 180 was used to provide illumination.

It is further noted that a Clark MXR fs Autocorrelator was used to measure pulse length and a Newport Model 835 Power Meter tuned to 400 nm wavelength, was used to measure the laser power. Measurements were taken while the laser was running at 1019 HZ and then energy per pulse was calculated. Post processing was perforemd using a Digital Instruments nanoscope II, Atomic Force Microscope (AFM). In addition, post damage analysis was performed by Advanced Micro Devices. Scaning Electron Microscope (SEM) images were taken of the top surface and a profile of the holes created, after the substrate was machined away with a focused ion beam, and then the holes were imaged at a 45 degree angle. The results of the described work are presented in Table 1. (Note that "Inner Diameter" indicates the largets width of the laser machined hole inside a rim build-up around said hole).

TABLE 1

| PULSES | ENERGY (nJ) | INNER DIAMETER ($\mu$m) | DEPTH ($\mu$m) | ASPECT RATIO |
|---|---|---|---|---|
| 10 | 14.7 | 1.38 | 0.59 | 0.43 |
| 10 | 29.4 | 1.72 | | |
| 10 | 39.3 | 1.75 | 1.03 | 0.59 |
| 10 | 49.1 | 1.87 | | |
| 100 | 4.91 | 1.13 | | |
| 100 | 14.7 | 1.49 | 3.65 | 2.45 |
| 100 | 19.6 | 1.6 | | |
| 100 | 29.4 | 1.96 | | |
| 100 | 44.2 | 1.98 | >10.2 | 5.15 |
| 1000 | 9.81 | 1.47 | >6.31 | 4.29 |
| 1000 | 14.7 | 1.71 | >10.4 | >6.08 |
| 1000 | 24.5 | 1.84 | | |
| 1000 | 34.3 | 2.13 | | |
| 1000 | 44.2 | 2.2 | >14.8 | >6.73 |
| 1000 | 49.1 | 2.18 | >15.3 | >6.48 |
| 2000 | 4.91 | 1.24 | | |
| 2000 | 9.81 | 1.49 | | |
| 2000 | 14.7 | 1.64 | | |
| 2000 | 19.6 | 1.80 | | |
| 2000 | 24.5 | 2.04 | | |
| 2000 | 29.4 | 2.11 | | |
| 2000 | 34.3 | 2.09 | | |
| 2000 | 39.3 | 2.15 | >15.8 | >7.35 |
| 2000 | 44.2 | 2.22 | >16.7 | >7.52 |
| 2000 | 49.1 | 2.18 | | |

Figure 6:
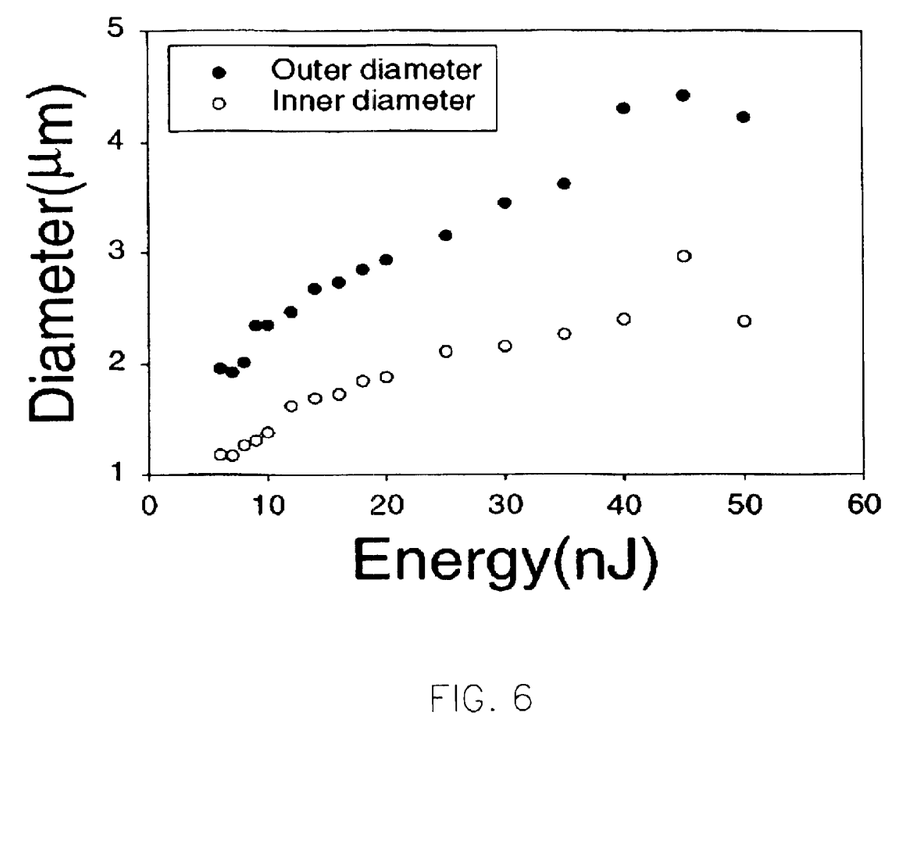
FIG. 6 shows a plot of Diameter vs. Energy(nJ) of laser pulse effected holes in P-type (111) Silicon with a restivity of 8 m-ohm-cm.
Figure 7:
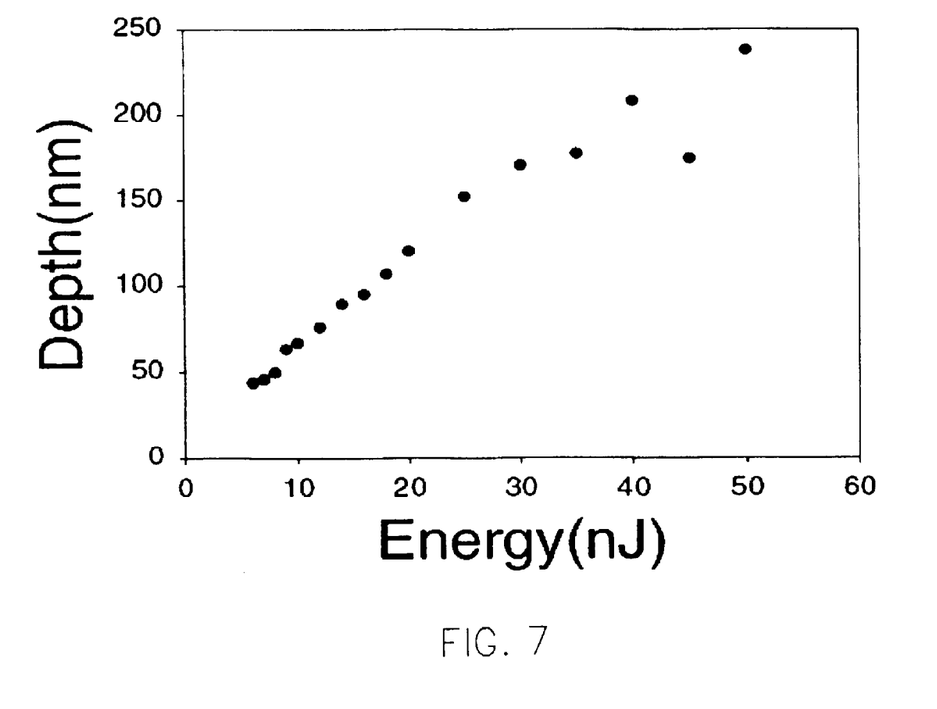
FIG. 7 shows a plot of Depth vs. Energy(nJ) of laser pulse effected holes in P-type (111) Silicon with a restivity of 8 m-ohm-cm.

FIG. 6 shows a plot of Diameter vs. Energy(nJ) of laser pulse effected holes in P-type (111) Silicon with a restivity of 8 m-ohm-cm, and FIG. 7 shows a plot of Depth vs. Energy(nJ) of laser pulse effected holes in P-type (111) Silicon with a restivity of 8 m-ohm-cm. Also shown in FIG. 6 is a regression fit based upon an equation:

$$D = SQRT(lnE)$$

provided by Linde and Schyler in an Article titled "Breakdown Threshold and Plasma Formation in Femtosecond Laser-Solid Interaction", J. of the Opt. Soc. of America B., Opt. Phys. 13(1), pp 216–222 (1996).

EXAMPLE 2

Results of the foregoing work made it evident that creation of laser machined high Aspect ratio holes in the (111) P-type Silicon which is present substantially motionless air, is accompanied by the unwanted side effect of nano scale particles building-up around the opening, thus creating a "rim" around said hole. The use of gas-flow and of a vacuum stream were investigated to determine is said adverse "rim" build-up effect could be reduced. In this work the laser set-up was similar to that previously disclosed, but the laser was operated at 795 nm wavelength and at a repetition frequency of 996 Hz. The final output level was set with a half wave-plate, CVI Part QWPO-800-05-2-R10, and a Glans Laser Polarizer, Melles Griot Part 03PGL303. The beam was directed with dichroic mirrors, CVI Part TLMI-800.0-1037 and is again focused by Optics Research Part No. LMU-15x-NUV. Because the focusing lens is optimized around 400 nm, power readings were taken before the lens with Newport Power Meter Model 835 and after the lens with Newport Power Meter Model 1815-c.

Laser pulses were applied while a gas was caused to flow from a short length of quarter inch stainless steel tubing through an apertures opening of 7.35 mm by 0.64 mm. Gas flow to abd from the nozzle was monitoried by Cole-Parmer FM044-40 flow rate sensor. Compressed nitrogen was used to form a jet stream and an Air Dimensions Model 01310TCQ Vacuum Pump was used to create a vacuum stream. Gas flow was directed parallel to the surfcae of the (111) P-type Silicon, which was held stationary by use of Ted Peella Colloidal Graphite Paint.

Table 2 gives the Power levels before and after objective lens with corresponding pulse energy:

TABLE 2

| POWER BEFORE LENS ($\mu$W) | POWER AFTER LENS ($\mu$W) | ENERGY (nJ) |
|---|---|---|
| 60.0 | 38.9 | 39.1 |
| 70.0 | 46.1 | 46.3 |
| 80.0 | 52.3 | 52.5 |
| 90.0 | 59.3 | 59.5 |
| 100.0 | 65.8 | 66.1 |

Before hte experiment the lasert pulse length was measured using a Clark MXR fs Autocorrelator, which resulted in a pulse length of 180 fs being measured. The material used was (100) P-type Silicon with 8 m-ohm-cm resistivity. All results were obtained on the same day to ensure identical laser parameters. After cleaning with methonol to remove unattached particles, post damage analysis was performed in-house with a Phillips XL30ESEM Environmental Scanning Electron Microscope (ESEM) to determine deposited surface debris. Three samples were processed. One Control sample was just left out in the atmosphere. A second was laser machined while a flow of nitrogen was caused at the laser focal point. The third sample was laser machined while a small vacuum pump caused an intake stream near the damage area. For each the laser was exposed for various times corresponding to a certain number of pulses, as listed in Table 3:

TABLE 3

| EXPOSURE TIME AND PULSE COUNT | |
|---|---|
| TIME (SEC) | PULSES |
| 0.1 | 100 |
| 0.2 | 199 |
| 0.5 | 498 |

TABLE 3-continued

EXPOSURE TIME AND PULSE COUNT

| TIME (SEC) | PULSES |
|---|---|
| 1.0 | 996 |
| 2.0 | 1992 |
| 5.0 | 4980 |

Figure 8:
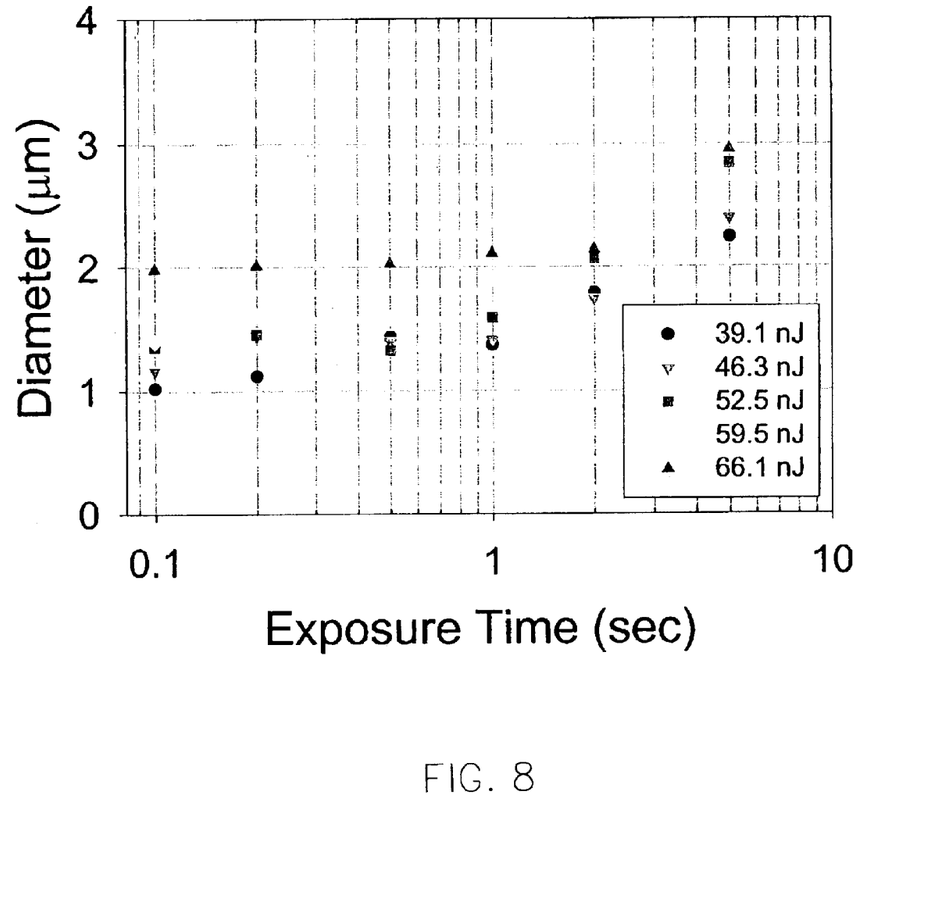
FIG. 8 shows damage diameters for various laser energies and exposure times.

The control sample was processed at the energy levels listed in Table 2. FIG. 8 shows damage diameters for various laser energies and exposure times. Note that the damage diameter has a slowly increasing trend up until the exposure time is one or two seconds. For longer exposure times the extra pulses cause a greater widening of the surface damage diameter than would be extrapolated from shorter exposure times.

Figure 9A:
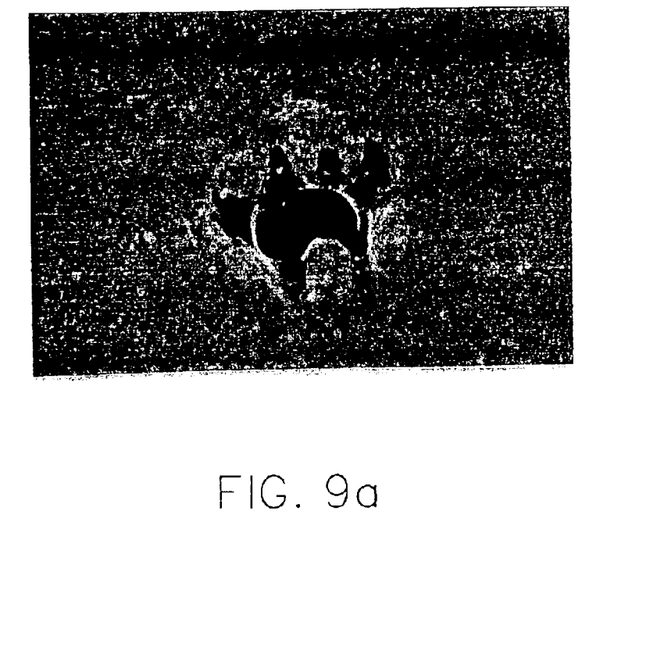
FIGS. 9a and 9b show SEM photos of holes created in (100) P-type Silicon with 8 m-ohm-cm resistivity by 0.1 second exposure to laser pulses, without and with application of a gas jet, respectively. Note the sharper edge in FIG. 9b.
Figure 9B:
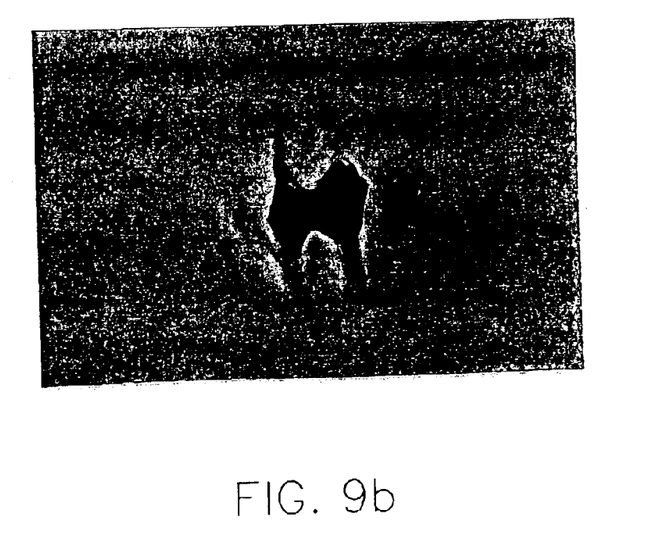

FIGS. 9*a* and 9*b* show SEM photos of holes created in (100) P-type Silicon with 8 m-ohm-cm resistivity by 0.1 second exposure to laser pulses, without and with application of a gas jet, respectively. Note the sharper edge in FIG. 9*b*.

To give insight to the flow rates utilized to achieve results as shown in FIG. 9*b*, Tables 4 and 5 relate Nitrogen Gas, and Vacuum caused Flow Rates as they are corelated to Nozzle velocities.

TABLE 4

NITROGEN FLOW

| FLOW RATE (l/min) | NOZZLE VELOCITY (m/sec) |
|---|---|
| 13.9 | 49.2 |
| 24.11 | 85.5 |
| 31.1 | 110.0 |
| 41.5 | 147.0 |
| 53.3 | 189.0 |

TABLE 5

VACUUM STREAM FLOW

| FLOW RATE (l/min) | NOZZLE VELOCITY (m/sec) |
|---|---|
| 5.43 | 19.3 |
| 10.4 | 36.9 |
| 15.3 | 54.3 |

From the foregoing it is evident that both gas jet and vacuum stream greatly reduce the debris deposited on the surface of a (100) P-type Silicon with 8 m-ohm-cm resistivity substrate.

It is to be specifically understood that the terminology "fluid" encompasses both liquid and gas.

It is also to be understood that while scribing materials, such as semiconductor substrates, to facilitate separating of individual devices in a substrate is to be considered to constitute machining of said materials, scribing is specifically mentioned as it is an important application of the disclosed invention.

It is also specifically noted that Patentability of the disclosed invention is believed found in systems and methodology of their use which enable gravity and/or material submerging fluid to remove particles dislodged from a laser scribed or machined surface of a material, in order to avoid untoward effects of their presence during further scribing or machining thereof. Additional attributes of the disclosed invention serve to optionally provide means and methodolgy for producing a sequence of short duration laser pulses from a single pulse, and for enabling simultaneous scribing or machining of two surfaces of a material, or two positions on a single surface thereof.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

We claim:

1. A method of performing a selection from the group consisting of:

laser scribing; and laser-machining;

materials while avoiding untoward effects of dislodged particles, comprising the steps of:

providing a laser pulse producing means and a material, a surface of which is to be laser scribed or machined;

orienting said laser pulse producing means and material such that laser pulses produced by said laser pulse producing means are caused to approach the surface of said material which is to be laser scribed or machined, from therebeneath, along an upward oriented locus;

such that particles dislodged by the application of said laser pulses to said surface of said material are caused to fall away therefrom under the influence of gravity.

2. A method of performing a selection from the group consisting of:

laser scribing; and laser-machining;

materials while avoiding untoward effects of dislodged particles, comprising the steps of:

providing a laser pulse producing means and a material, a surface of which is to be laser scribed or machined;

orienting said laser pulse producing means and material such that laser pulses produced by said laser pulse producing means are caused to approach said surface, which is caused to be substantially vertically oriented, along an upward oriented locus;

such that particles dislodged by the application of said laser pulses to said surface of said material are caused to fall away therefrom under the influence of gravity.

3. A method of performing a selection from the group consisting of:

laser scribing; and laser-machining;

materials while avoiding untoward effects of dislodged particles, comprising the steps of:

providing a laser pulse producing means and a material, a surface of which is to be laser scribed or machined;

orienting said laser pulse producing means and material such that laser pulses produced by said laser pulse producing means are caused to approach said surface of said material, which is oriented to face between vertically downward and horizontally, along a locus which is oriented upward;

such that particles dislodged by the application of said laser pulses to said surface of said material are caused to fall away therefrom under the influence of gravity.

4. A method of performing a selection from the group consisting of:
   laser scribing; and
   laser-machining;
materials while avoiding untoward effects of dislodged particles, comprising the steps of:
   providing a laser pulse producing means and a material, a surface of which is to be laser scribed or machined;
   providing a liquid containing means and placing said material thereinto;
   orienting said laser pulse producing means and material which is placed into said liquid containing means such that laser pulses produced by said laser pulse producing means are caused to approach the surface of said material to be laser scribed or machined along a locus which passes through said liquid;
such that particles dislodged by the application of said laser pulses to said surface of said material are caused to be removed therefrom via said liquid.

5. A method of performing a selection from the group consisting of:
   laser scribing; and
   laser-machining;
materials while avoiding untoward effects of dislodged particles, comprising the steps of:
   providing a laser pulse producing means and a material, which is to be laser scribed or machined;
   providing a beam splitter and beam directing means such that a laser pulse entering thereinto exits therefrom as two pulses, each of which can be directed by said beam directing means to interact with said material;
   orienting said laser pulse producing means and material such that laser pulses produced by said laser pulse producing means are caused to pass through said beam splitter, with the resulting two pulses being directed in a manner characterized by a selection from the group consisting of:
      to interact with different surfaces of said material; and
      to interact with a surface of said material at different locations thereupon;
at least one surface which is laser scribed or machined being oriented to be generally downward facing such that dislodged particles fall away therefrom under the influence of gravity;
said method being characterized in that laser pulses are caused to approach and interact with said at least one generally downward facing surface alone an upward oriented locus.

6. A method as in claim 5, in which said material is caused to be oriented substantially vertically and laser pulses are applied to both sides thereof such that particles dislodged by the application of said laser pulses are caused to fall away from both surfaces of said material, under the influence of gravity.

7. A method as in claim 1 in which the laser pulse producing means further comprises means for formation of a series of laser pulses by splitting a laser pulse into two such laser pulses, entering a time delay into one thereof and then recombining the two pulses into a sequence of two laser pulses.

8. A method as in claim 2 in which the laser pulse producing means further comprises means for formation of a series of laser pulses by splitting a laser pulse into two such laser pulses, entering a time delay into one thereof and then recombining the two pulses into a sequence of two laser pulses.

9. A method as in claim 3 in which the laser pulse producing means further comprises means for formation of a series of laser pulses by splitting a laser pulse into two such laser pulses, entering a time delay into one thereof and then recombining the two pulses into a sequence of two laser pulses.

10. A method as in claim 4 in which the laser pulse producing means further comprises means for formation of a series of laser pulses by splitting a laser pulse into two such laser pulses, entering a time delay into one thereof and then recombining the two pulses into a sequence of two laser pulses.

11. A method as in claim 5 in which the laser pulse producing means further comprises means for formation of a series of laser pulses by splitting a laser pulse into two such laser pulses, entering a time delay into one thereof and then recombining the two pulses into a sequence of two laser pulses.

12. A method as in claim 1 in which electrons developed by interaction of laser pulses with a material are utilized to effect real time observation and optionally control of said laser-machining results.

13. A method as in claim 2 in which electrons developed by interaction of laser pulses with a material are utilized to effect real time observation and optionally control of said laser-machining results.

14. A method as in claim 3 in which electrons developed by interaction of laser pulses with a material are utilized to effect real time observation and optionally control of said laser-machining results.

15. A method as in claim 4 in which electrons developed by interaction of laser pulses with a material are utilized to effect real time observation and optionally control of said laser-machining results.

16. A method as in claim 5 in which electrons developed by interaction of laser pulses with a material are utilized to effect real time observation and optionally control of said laser-machining results.

17. A method of performing a selection from the group consisting of:
   laser scribing; and
   laser-machining;
materials while avoiding untoward effects of dislodged particles, comprising the steps of:
   providing a laser pulse producing means and a material which is to be machined, said laser pulse producing means providing femto second or shorter pulses;
   directing laser pulses produced by said laser pulse producing means to approach a surface of the material to be scribed or machined along a locus characterized by at least one selection from the group consisting of:
      being oriented upward; and
      passing through a liquid;
such that particles dislodged by the application of said laser pulses to said surface of said material to be scribed or machined are caused to be removed therefrom under the influence of gravity and/or via said liquid.

18. A method as in claim 17 in which the laser pulse producing means further comprises means for formation of a series of laser pulses by splitting a laser pulse into two such laser pulses, entering a time delay into one thereof and then recombining the two pulses into a sequence of two laser pulses.

19. A method as in claim 1 or 2 or 3 or 4 or 5 or 6 or 7 or 8 or 9 or 10 or 11 or 12 or 13 or 14 or 15 or 16 or 17 or 18 in which the laser pulses are caused to be femto-second or shorter in duration.

20. A method as in claim 1 or 2 or 3 or 4 or 5 or 6 or 7 or 8 or 9 or 10 or 11 or 12 or 13 or 14 or 15 or 16 or 17 or 18 in which the laser pulses are caused to be femto second or shorter and the material is diamond or other semiconductor.

21. A system for performing a selection from the group consisting of:

laser scribing; and laser-machining;

generally downward facing surfaces of materials while avoiding untoward effects of dislodged particles, comprising:

femto second or shorter laser pulse producing means;

said femto second or shorter laser pulse producing means being oriented in said system such that laser pulses produced thereby are caused to approach a generally downward facing surface of said material to be scribed or machined from therebeneath, along an upward oriented locus;

such that in use particles dislodged by the application of said femto second or shorter laser pulses to said generally downward facing surface of said material are caused to fall away therefrom under the influence of gravity.

22. A system as in claim 21 in which said laser pulses are caused to approach the surface of said material from therebeneath via:

mirror means;

at least one lens; and an aperture plate;

such that the femto second or shorter laser pulse producing means provides laser pulses to the surface of the material by way of reflection from said mirror means, and wherein said at least one lens serves to focus the pulses through said aperture plate and toward said material surface; the aperture plate being situated above said mirror means and below said downward facing surface of said material so as to intercept dislodged particles and prevent their accumulation on said mirror means.

23. A system for producing a sequence of laser pulses comprising:

femto second or shorter laser pulse producing means;

beam splitter means;

first mirror means;

time delay entry means;

second mirror means; and beam combiner means;

such that laser pulses produced by said femto second or shorter laser pulse producing means are caused to impinge on said beam splitter with approximately half thereof passing directly to said beam combiner means, and with the remaining approximatley half thereof being caused to interact with, in any functional order, said first mirror means, time delay entry means, and second mirror means before passing to said beam combiner; there emerging from said beam combiner, for each laser pulse entered to the beam splitter, a sequence of pulses offset in time from one another.

24. A system for performing a selection from the group consisting of:

laser scribing; and laser-machining;

materials while avoiding untoward effects of dislodged particles, comprising:

a femto second or shorter laser pulse producing means, said system further comprising means therewithin to direct laser pulses onto a material surface which is oriented to face downward, along a locus which is oriented upward;

such that in use particles dislodged by the application of said laser pulses to said surface of said material are caused to fall away therefrom under the influence of gravity.

25. A system for performing a selection from the group consisting of:

laser scribing; and laser-machining;

materials while avoiding untoward effects of dislodged particles, which is comprised of:

a femto second or shorter laser pulse producing means;

beam splitter;

first mirror means;

second mirror means; and optionally additional mirror means;

oriented such that laser pulses provided by the femto second or shorter laser pulse producing means are caused to enter said beam splitter, with approximatley half of each laser pulse passing directly through said beam spliter and impinging on a surface of said material, and with the remaining approximately half of each laser pulse proceeding to interact with said second and optionally additional mirror means and then impinge on another surface of said material;

at least one said surface of said material being oriented to face downward with said laser pulses which impinge thereupon being directed along an upward oriented locus.

26. A system for performing a selection from the group consisting of:

laser scribing; and laser-machining;

materials while avoiding untoward effects of dislodged particles, comprising:

a femto second or shorter laser pulse producing means in functional combination with means for submerging a surface of a material, which surface is to be laser scribed or machined, in a liquid;

said laser pulse producing means being oriented in said system such that laser pulses produced by said laser pulse producing means are caused to approach the surface of said material to be laser scribed or machined along a locus which passes through said liquid;

such that in use particles dislodged by the application of said laser pulses to said surface of said material are caused to be entered to said liquid.

27. A system as in claim 26 wherein the laser producing means are situated vertically above the material surface so that laser pulses approach the material along a downward trajectory.

28. A system as in claim 26 wherein the laser producing means are situated below the material surface so that laser pulses approach the material along an upward trajectory.

29. A system as in claim 26 wherein the laser producing means are situated lateral to the material surface so that laser pulses approach the material along a lateral trajectory.

30. A method as in claim 4 in which the laser pulses are cause to pass through a non-gaseous liquid selected from the group consisting from:

water;

acetone;

methonal;

ethanol; and trichloroethylyne.

31. A method as in claim 17 in which the laser pulses are cause to pass through a non-gaseous liquid selected from the group consisting from:
- water;
- acetone;
- methonal;
- ethanol; and
- trichloroethylyne.

32. A system as in claim 26 in which the liquid is non-gaseous and is selected from the group consisting from:
- water;
- acetone;
- methonal;
- ethanol; and
- trichloroethylyne.

33. A method as in claim 4, in which the laser pulses produced by said laser pulse producing means are caused to approach the surface of said material to be laser scribed or machined approach said surface along an upward oriented locus.

34. A method as in claim 26, in which the laser pulses produced by said laser pulse producing means are caused to approach the surface of said material to be laser scribed or machined approach said surface along an upward oriented locus.

35. A system as in claim 23 which further comprises a means for receiving the sequence of pulses offset in time from one another which emerge from said beam combiner, and directing them along an upward oriented locus.

36. A method as in claim 1, wherein said particles dislodged by the application of said laser pulses to said surface of said material are further caused to be removed under the influence of a fluid which is caused to flow at the said surface.

37. A system as in claim 21, which further comprises means for submerging said material in a liquid through which said laser pulses must travel to impinge upon said downward facing surface, such that particles dislodged by the application of said femto second or shorter laser pulses are further caused to be removed thereby.

* * * * *